United States Patent
Sarkis et al.

(10) Patent No.: US 11,424,802 B2
(45) Date of Patent: Aug. 23, 2022

(54) CSI REPORT INCLUDING INFORMATION IDENTIFYING CSI-RS

(71) Applicant: QUALCOMM Incorporated, San Diego, CA (US)

(72) Inventors: Gabi Sarkis, San Diego, CA (US); Sudhir Kumar Baghel, Hillsborough, NJ (US); Kapil Gulati, Belle Mead, NJ (US); Shuanshuan Wu, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/069,720

(22) Filed: Oct. 13, 2020

(65) Prior Publication Data
US 2021/0143882 A1    May 13, 2021

Related U.S. Application Data

(60) Provisional application No. 62/933,259, filed on Nov. 8, 2019.

(51) Int. Cl.
*H04W 72/04* (2009.01)
*H04B 7/06* (2006.01)
*H04L 5/00* (2006.01)
*H04L 1/18* (2006.01)
*H04W 72/02* (2009.01)
(Continued)

(52) U.S. Cl.
CPC ......... *H04B 7/0626* (2013.01); *H04L 1/1642* (2013.01); *H04L 1/1819* (2013.01); *H04L 5/0051* (2013.01); *H04W 72/02* (2013.01); *H04W 72/0406* (2013.01); *H04W 72/0446* (2013.01); *H04W 80/02* (2013.01)

(58) Field of Classification Search
CPC ................ H04B 7/0626; H04W 72/02; H04W 72/0446; H04L 1/0026
See application file for complete search history.

(56) References Cited

U.S. PATENT DOCUMENTS 10,952,240 B2 * 3/2021 Rahman ................ H04L 5/0048
2012/0257524 A1 * 10/2012 Chen ...................... H04W 24/10
370/252

(Continued)

OTHER PUBLICATIONS

3GPP TSG RAN WG1 #98bis: Title: Physical Layer Procedures for NR V2X Sidelink: Source: InterDigital, Inc. R1-1911280; Oct. 14-20, 2019. pp. 1-14 (Year: 2019).*

(Continued)

*Primary Examiner* — Fahmida S Chowdhury
(74) *Attorney, Agent, or Firm* — ArentFox Schiff LLP

(57) ABSTRACT

A method, a computer-readable medium, and an apparatus for wireless communication at a first user equipment (UE). A channel state information (CSI) report trigger can be received from a second UE, and a channel state information reference signal (CSI-RS) can be received from the second UE in a same slot as the CSI report trigger. A CSI report can be transmitted to the second UE based on the CSI-RS, the CSI report including information identifying the CSI-RS on which the CSI report is based. The UE that triggered the CSI report can determine the CSI-RS on which the CSI report is based using the information included in the CSI report.

30 Claims, 11 Drawing Sheets

(51) Int. Cl.
*H04W 80/02* (2009.01)
*H04L 1/16* (2006.01)

(56) References Cited

U.S. PATENT DOCUMENTS

| | | | | |
|---|---|---|---|---|
| 2013/0322376 | A1* | 12/2013 | Marinier | H04B 7/0456 |
| | | | | 370/329 |
| 2015/0327107 | A1* | 11/2015 | Kim | H04W 56/0045 |
| | | | | 370/252 |
| 2018/0048447 | A1 | 2/2018 | Nogami et al. | |
| 2018/0092156 | A1* | 3/2018 | Kim | H04W 12/03 |
| 2019/0053212 | A1* | 2/2019 | Liu | H04W 72/0406 |
| 2019/0349051 | A1* | 11/2019 | Sarkis | H04B 17/309 |
| 2019/0349919 | A1* | 11/2019 | Oh | H04W 72/0413 |
| 2021/0328746 | A1* | 10/2021 | Sandberg | H04L 5/1469 |

OTHER PUBLICATIONS

International Search Report and Written Opinion dated Feb. 8, 2021 from Corresponding PCT Application No. PCT/US2020/055569.

Interdigital et al: "Physical Layer Procedures for NR V2X Sidelink", 3GPP Draft; R1-1911280 Physical Layer Procedures for NR V2X Sidelink_Final, 3rd Generation Partnership Project (3GPP), Mobile Competence Centre ; 650, Route Des Lucioles; F-06921 Sophia-Antipolis CED vol. RAN WG1, No. Chongqing, China; Oct. 14, 2019-Oct. 20, 2019 Oct. 7, 2019 (Oct. 7, 2019-), XP051790049, Retrieved from the Internet: URL:http://www.3gpp.org/ftp/tsg_ran/WG1_RL 1/TSGR1_98b/Docs/ R1-1911280.zip [retrieved on Oct. 7, 2019].

LG Electronics: "Feature lead summary #2 for Al 7.2.4.5 Physical layer procedures for sidelink", 3GPP Draft; R1-1911702 Feature Lead Summary of PHY Procedure in NR Sidelink #2, 3rd Generation Partnership Project (3GPP), Mobile Competence Centre ; 650, Route Des Lucioles; F-06921 Sophia-Antipolis vol. RAN WG1, No. Chongqing, China; Oct. 14, 2019-Oct. 20, 2019 Oct. 22, 2019 (Oct. 22, 2019), XP051798944, Retrieved from the Internet: URL:https://ftp.3gpp.org/tsg_ran/WG1_RL 1/TSGR1_98b/Docs/ R1-1911702.zip R1-1911702 feature lead summary of PHY procedure in NR sidelink #2.docx [retrieved on Oct. 22, 2019].

* cited by examiner

US 11,424,802 B2

CSI REPORT INCLUDING INFORMATION IDENTIFYING CSI-RS

CLAIM OF PRIORITY UNDER 35 U.S.C. § 119

The present Application for Patent claims priority to U.S. Provisional Patent Application No. 62/933,259, entitled "CSI REPORT INCLUDING INFORMATION IDENTIFYING CSI-RS" filed Nov. 8, 2019, which is assigned to the assignee hereof and hereby expressly incorporated by reference herein for all purposes.

BACKGROUND

Technical Field

The present disclosure relates generally to communication systems, and more particularly, to sidelink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices. The communication may be based on sidelink or a PC5 interface. Examples of communication directly between devices includes vehicle-to-vehicle (V2V) communication, vehicle-to-infrastructure (V2I) communication, etc., which can be collectively referred to as vehicle-to-anything (V2X) communication, and other device-to-device (D2D) communication. There exists a need for further improvements for communication based on sidelink. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus receives a channel state information (CSI) report trigger from a second UE; receives a channel state information reference signal (CSI-RS) from the second UE in a same slot as the CSI report trigger, and transmits a CSI report to the second UE based on the CSI-RS, the CSI report comprising information identifying the CSI-RS on which the CSI report is based.

In another aspect of the disclosure, a method, a computer-readable medium, and an apparatus are provided for wireless communication at a first UE. The apparatus transmits a CSI report trigger to a second UE and transmits a CSI-RS to the second UE in a same slot as the CSI report trigger. The apparatus receives a CSI report from the second UE based on the CSI-RS, the CSI report comprising information identifying the CSI-RS on which the CSI report is based. The apparatus determines the CSI-RS on which the CSI report is based using the information comprised in the CSI report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
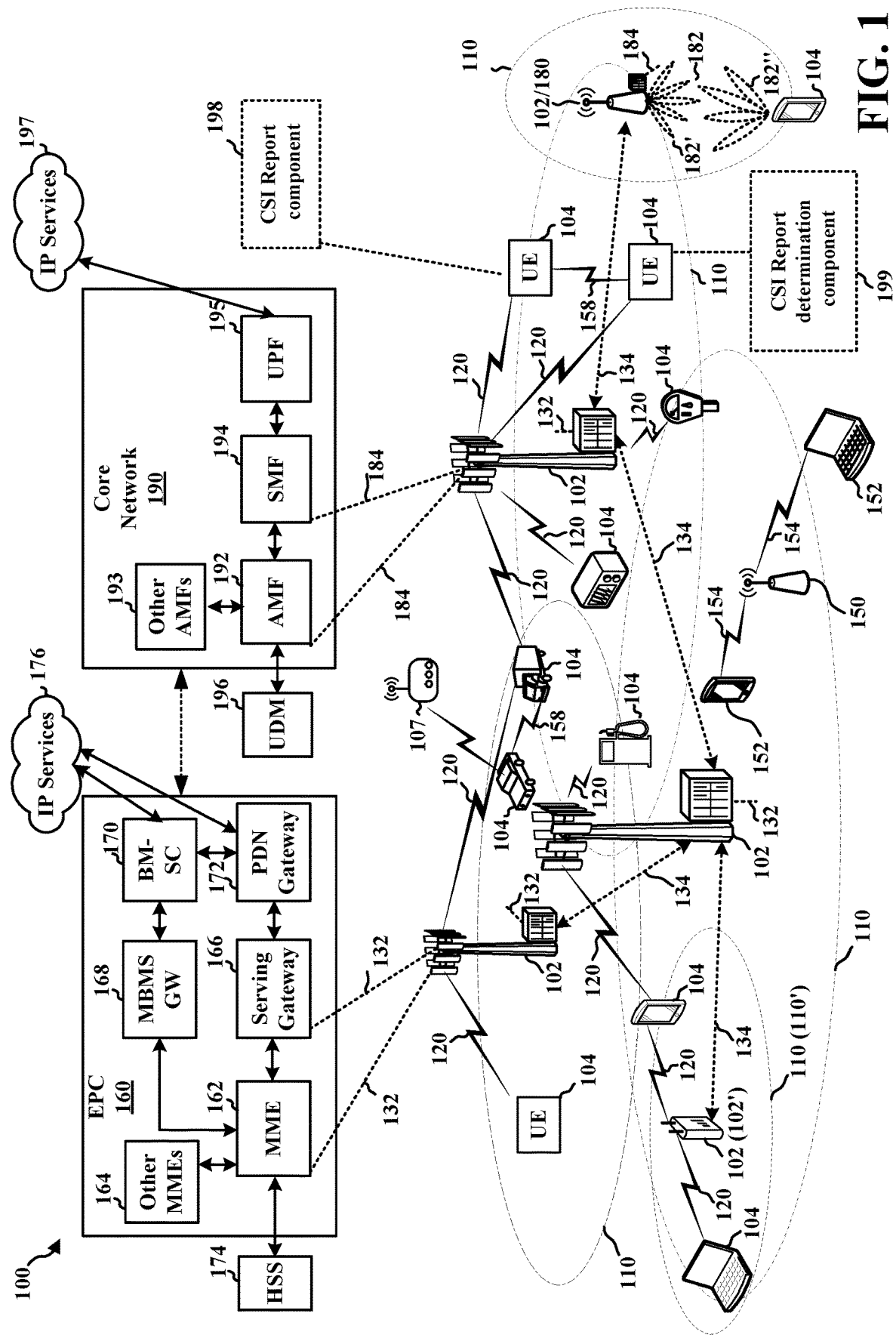
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A device involved in direct communication with another device, such as sidelink communication between user equipment (UEs), may trigger a channel state information (CSI) report from the other device. For example, a triggering device may transmit a CSI report trigger to a reporting device. The triggering device may also transmit a channel state information-reference signal (CSI-RS) in the same slot as the CSI report trigger. The reporting device may receive the CSI report trigger and the CSI-RS, and may respond by performing measurements based on the CSI-RS and transmitting a CSI report to the triggering device that triggered the CSI report. In some examples, the triggering device may send multiple CSI report triggers with corresponding CSI-RS before receiving the CSI report from the reporting device. In such examples, the triggering device may be unaware of the particular CSI-RS to which the CSI report pertains.

Aspects presented herein relate to the reporting device transmitting a CSI report including information that may identify, or assist in identifying, the CSI-RS on which the CSI report is based. For example, the information in the CSI report may include an indication of a system frame number or a direct frame number indicating when the CSI-RS was transmitted (or received). In another example, the information in the CSI report may additionally or alternatively include an indication of a slot index within the system frame number or direct frame number when the CSI-RS was transmitted (or received). In another example, the information in the CSI report may additionally or alternatively include an indication of an absolute time when the CSI-RS was transmitted (or received). In another example, the information in the CSI report may additionally or alternatively include an indication of a Hybrid Automatic Repeat Request (HARQ) process identifier (ID) for a slot or a shared channel in which the CSI-RS was received. In another example, the information in the CSI report may include a combination of such information about the CSI-RS on which the CSI report is based. The triggering device that receives the CSI report may determine the CSI-RS on which the CSI report is based using the information included in the CSI report, which can allow for more accurate identification of the CSI-RS on which the report is based and adjustment of communication parameters based on the report. Moreover, for example, though concepts are generally described herein in terms of communications between UEs (e.g., triggering and reporting UEs), the concepts can be similar applied to substantially any device that communicated in a wireless network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or road side unit (RSU) 107 to communicate with another UE 104 or RSU 107, such as based on V2X, V2V, or other D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication may be transmitted based on sidelink. For example one UE 104 may transmit and receive communication directly from another UE. Aspects of the communication may be based on PC5 or sidelink communication e.g., as described in connection with the example in FIG. 2. Examples of sidelink communication may include vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications, Proximity Services (ProSe) communication, or other D2D communication. Although the following description may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, the a UE 104 may receive a CSI report trigger from another UE and a CSI-RS (e.g., in the same slot as the CSI report trigger). The UE 104 may include a CSI report component 198 configured to transmit a CSI report to the second UE based on the CSI-RS, where the CSI report may include information identifying the CSI-RS on which the CSI report is based. For example, the information in the CSI report may include an indication of a system frame number or a direct frame number indicating when the CSI-RS was transmitted (or received). In another example, the information in the CSI report may additionally or alternatively include an indication of a slot index within the system frame number or the direct frame number when the CSI-RS was transmitted (or received). In another example, the information in the CSI report may include an indication of an absolute time when the CSI-RS was transmitted (or received). In another example, the information in the CSI report may include a HARQ process identifier (ID) for a slot or a shared channel in which the CSI-RS was received. In another example, the information in the CSI report may include a combination of such information about the CSI-RS on which the CSI report is based. In an example, the UE 104 that triggered the CSI report may include a CSI report determination component 199 configured to determine the CSI-RS on which the CSI report is based using the information included in the CSI report.

Figure 2:
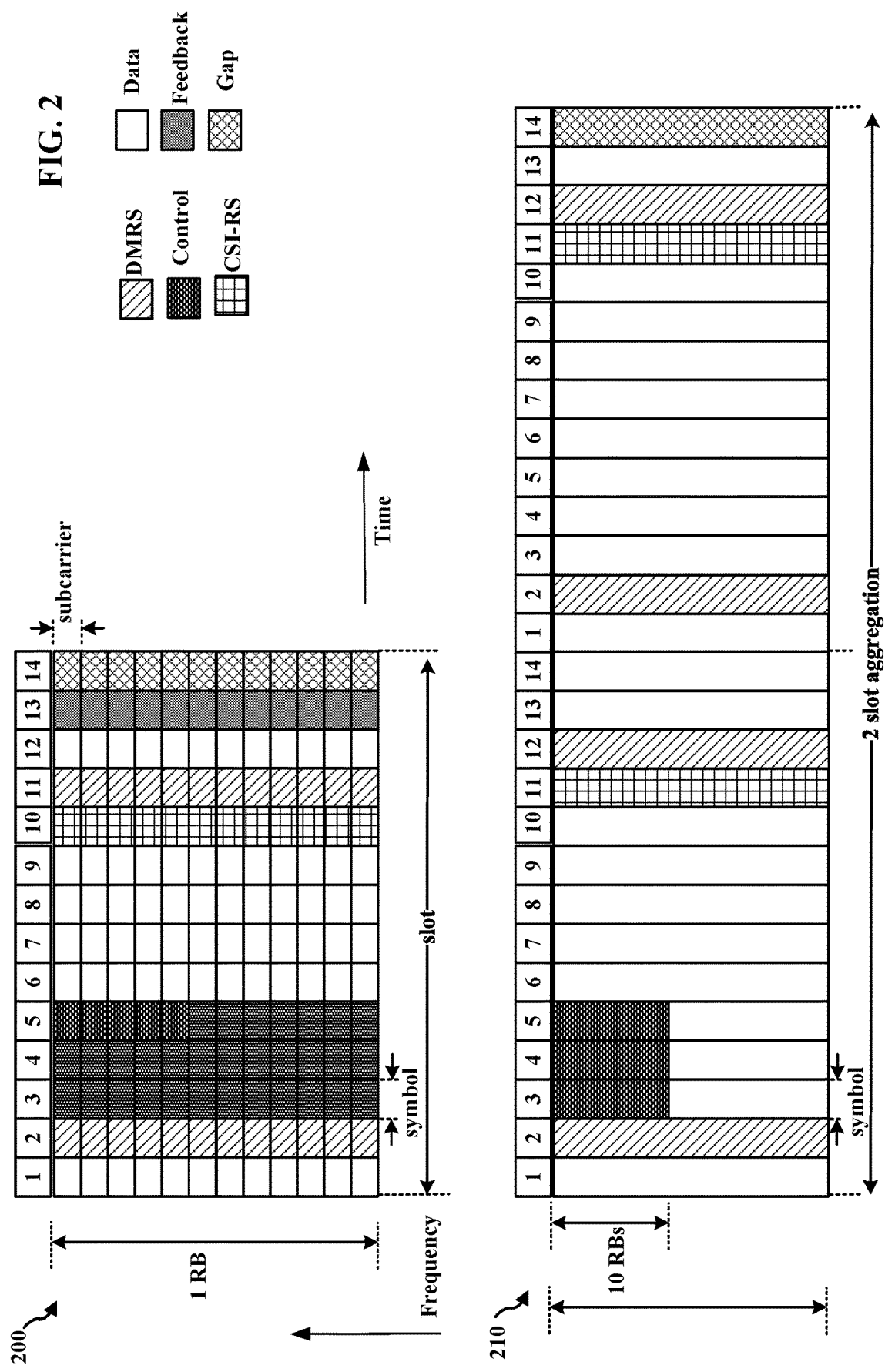
FIG. 2 illustrates examples of aspects of a sidelink slot structure.

FIG. 2 illustrates diagrams 200 and 210 of examples of slot structures that may be used for wireless communication between UEs 104, e.g., for sidelink communication. In some examples, the slot structure may be within a 5G NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information, e.g., along with demodulation RS (DMRS).

FIG. 2 also illustrates that symbol(s) may include CSI-RS. The symbols in FIG. 2 that are indicated for DMRS or CSI-RS indicate that the symbol includes DMRS or CSI-RS REs. Such symbols may also include REs that include data. For example, if a number of ports for DMRS or CSI-RS is 1 and a comb-2 pattern is used for DMRS/CSI-RS, then half of the REs may include the RS and the other half of the REs may include data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots.

The control information may include Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
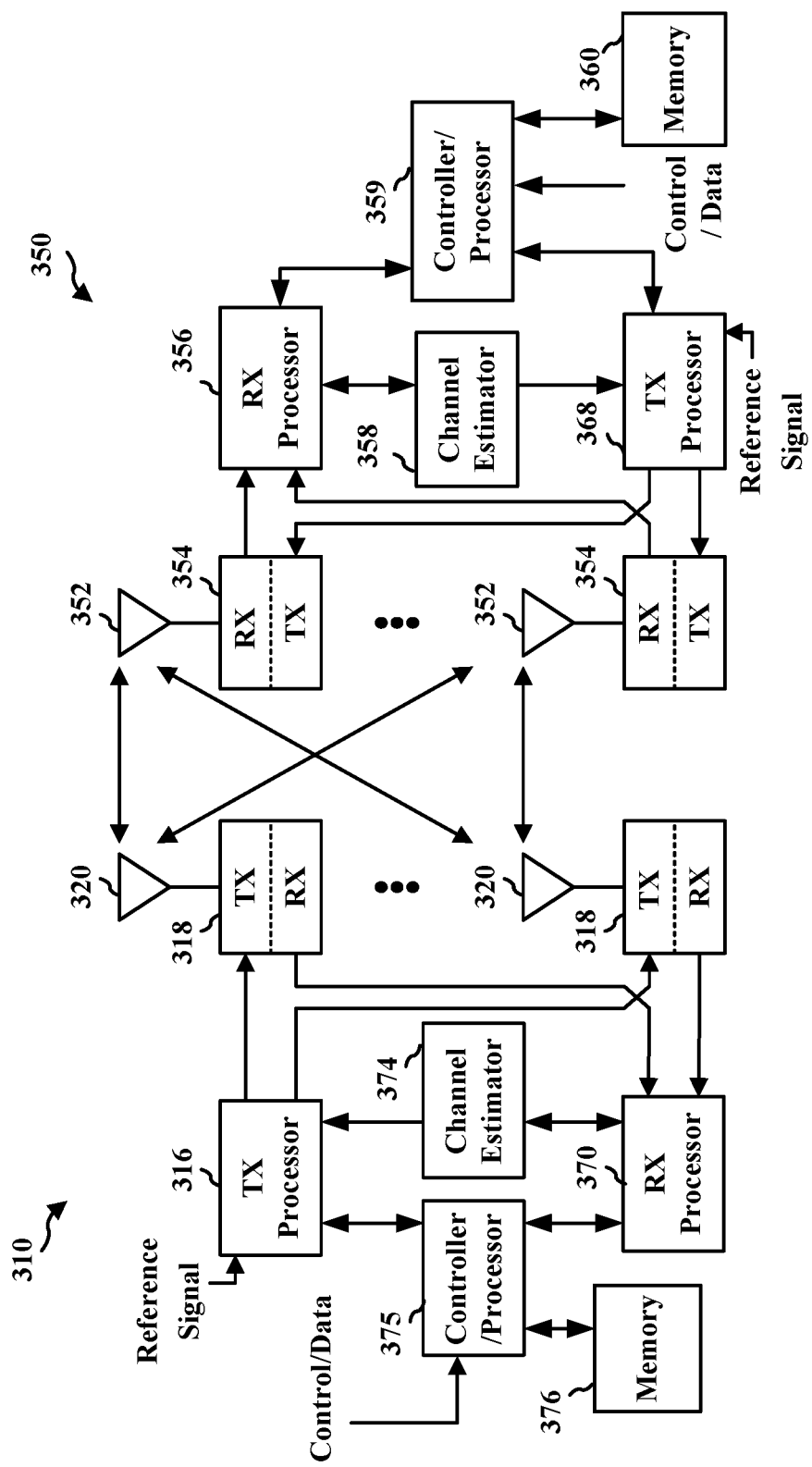
FIG. 3 is a diagram illustrating an example of a first device and a second device involved in wireless communication based, e.g., on device-to-device communication such as sidelink communication.

FIG. 3 is a block diagram of a first wireless communication device 310 in communication with a second wireless communication device 350, e.g., based on sidelink communication. The device 310 may be a transmitting device communicating directly with a receiving device, e.g., device 350, via sidelink communication. The device 310 may be a UE, an RSU, etc. The receiving device may be a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with a CSI report component 198 and/or a CSI report determination component 199 of FIG. 1.

Figure 4:
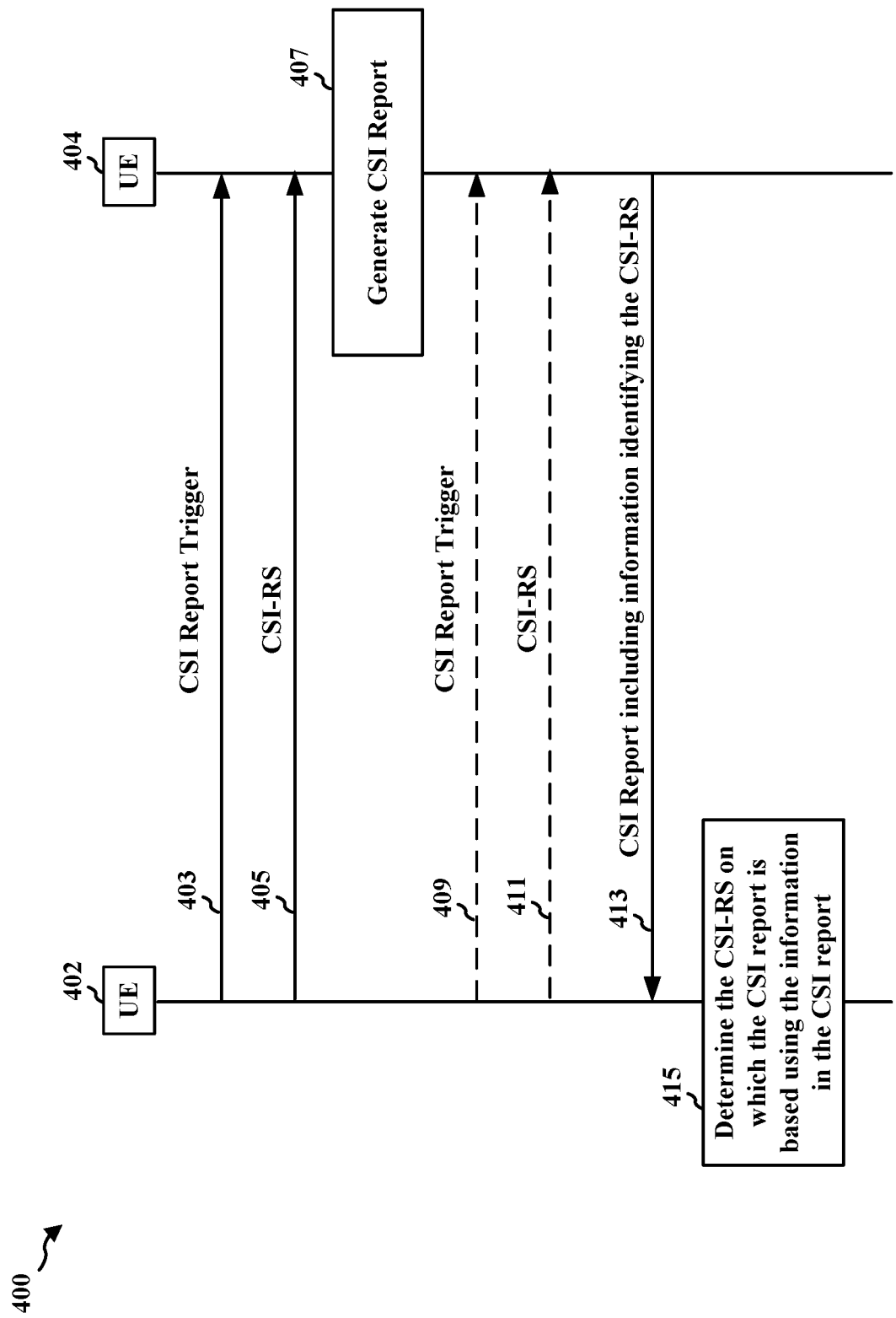
FIG. 4 is an example of a communication flow between a first UE and a second UE including the transmission of a CSI report in accordance with aspects of the present disclosure.

FIG. 4 illustrates an example of a communication flow 400 for wireless communication based on sidelink. For example, the communication may include any of V2X, ProSe, or other D2D communication. The communication may be based on a slot structure including aspects described in connection with FIG. 2. For example, UE 402 may transmit a sidelink communication, e.g., including a control channel and/or a corresponding data channel, that may be received directly by UE 404. A control channel may include information for decoding a data channel and may also be used by UE 404 to avoid interference by refraining from transmitting on the occupied resources during a data transmission. The number of TTIs, as well as the RBs to be occupied by the data transmission, may be indicated in a control message from the transmitting device. The UEs 402 and 404 may each be capable of operating as a transmitting device in addition to operating as a receiving device. Although FIG. 4 is described using the example of two UEs 402 and 404, the aspects may be similarly applied by an RSU or other device communicating based on sidelink.

Figure 5:
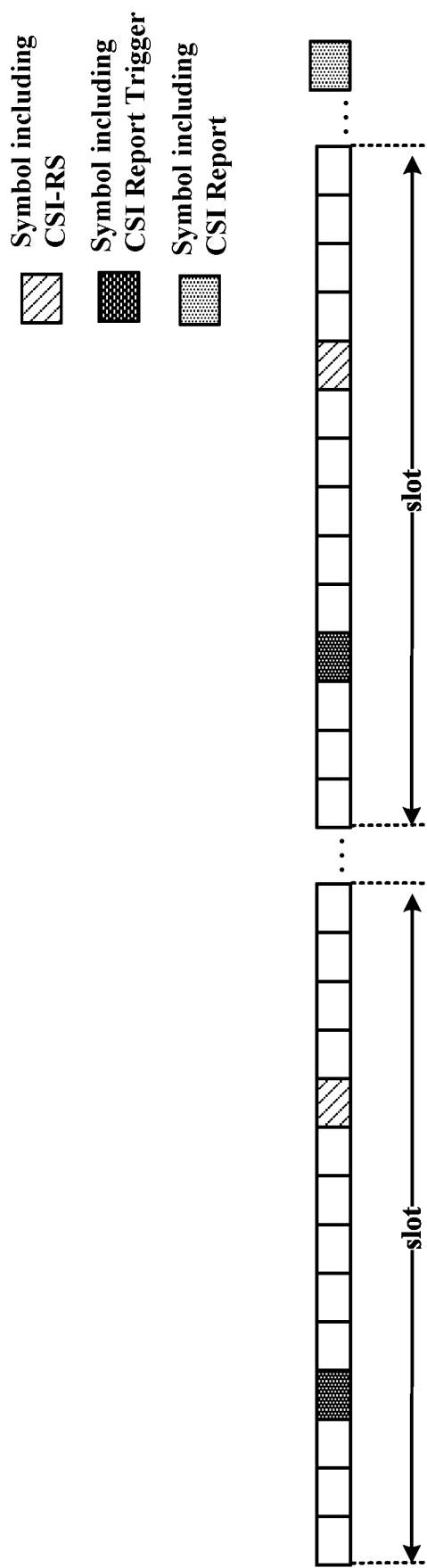
FIG. 5 illustrates a diagram showing examples of timing for a CSI report trigger, CSI-RS, and CSI report in accordance with aspects of the present disclosure.

The UE 402 may request a CSI report from the UE 404. Therefore, the UE 402 may be referred to as the triggering UE, and the UE 404 may be referred to as the reporting UE. As illustrated in FIG. 4, the triggering UE 402 may transmit a CSI report trigger 403 to the reporting UE 404. The CSI report trigger 403 may include an indication that is transmitted in sidelink control information (SCI). The SCI may be transmitted over the PSCCH. The CSI report trigger may request, or otherwise trigger, a report including CSI, where the CSI may include a channel quality indicator (CQI), a rank indicator (RI), and/or other information indicating a channel quality, channel state, status, etc. The CSI report trigger 403 may indicate that the triggering UE 402 transmits the CSI-RS for requested CSI report in the same slot as the SCI. For example, FIG. 5 illustrates an example time diagram 500 showing a slot that includes a CSI report trigger and that also includes a CSI-RS to be reported in a CSI report triggered by the CSI report trigger.

In one example, the triggering UE 402 may transmit a sidelink CSI-RS in various scenarios and/or based on one or multiple conditions. For example, the triggering UE 402 can transmit a CSI-RS where the UE 402 transmits a PSSCH corresponding to the PSCCH, when sidelink CQI and RI reporting is enabled by higher layer signaling (such as via an enable flag), if the corresponding SCI includes the CSI report trigger 403, etc.

In response to receiving the CSI report trigger 403, the reporting UE 404 may be aware to monitor for the CSI-RS 405 in the same slot. The UE 404 may perform measurements based on the received CSI-RS 405 and may generate a CSI report, at 407. The CSI report may include a CQI and/or RI determined based on the CSI-RS 405.

The reporting UE 404 may transmit a CSI report 413 to the triggering UE 402 in response to receiving the CSI report trigger 403. The CSI report 413 may be generated, at 407, based on the CSI-RS 405. The CSI report 413 may be transmitted in a media access control-control element (MAC-CE) that may be sent over PSSCH with an associated SCI. In some aspects, a portion of the communication may be transmitted over PSCCH and a second portion may be transmitted over PSSCH. The MAC-CE may include a layer 2 ID (L2 ID). The corresponding SCI may include a layer 1 (L1) source ID identifying the reporting UE 404 and a L1 destination ID identifying the triggering UE 402. The L1 source ID and the L1 destination ID may be derived from the L2 ID.

In some examples, the triggering UE 402 may send additional CSI report triggers (e.g., CSI report trigger 409) and corresponding CSI-RS (e.g., CSI-RS 411) while waiting to receive the CSI report from the reporting UE 404. Although only a single additional CSI report trigger 409 and corresponding CSI-RS 405 is illustrated, in some examples, the triggering UE 402 may transmit more than one additional CSI report trigger 409 and corresponding CSI-RS 411 before receiving a CSI report 413 from the reporting UE 404. The time diagram in FIG. 5 similarly illustrates that a CSI report trigger and corresponding CSI-RS may be sent in more than one slot before a CSI report is transmitted. For example, the reporting UE 404 may need to wait until resources are available for transmission of the CSI report, and may receive another CSI report trigger and/or CSI-RS in the meantime.

As the triggering UE 402 may have transmitted multiple CSI report triggers and corresponding CSI-RS to the reporting UE 404, for a given CSI-RS report 413 received from the reporting UE 404, the triggering UE 402 may not know which CSI-RS (e.g., CSI-RS 405 or 411) is the basis of the CSI report 413. Therefore, the CSI report 413 may include information to assist in identifying the CSI-RS 405 on which the CSI report 413 is based. For example, the information identifying the CSI-RS 405 may include an indication of a system frame number for the CSI-RS 405. For example, the indication of the system frame number may include the actual system frame number or one or more parameters based on which the system frame number can be determined (e.g., a relative offset of the system frame number from a current system frame number). For example, the system frame number may correspond to the system frame number when the CSI-RS 405 was transmitted by the triggering UE 402 or received by the reporting UE 404.

In another example, the information identifying the CSI-RS 405 may additionally or alternatively include an indication of a direct frame number for the CSI-RS 405, e.g., corresponding to the direct frame number when the CSI-RS 405 was transmitted by the triggering UE 402 or received by the reporting UE 404. For example, the indication of the direct frame number may include the actual direct frame number or one or more parameters based on which the direct frame number can be determined (e.g., a relative offset of the direct frame number from a current direct frame number). For example, a direct frame number can be a frame number that can be derived based on a current time (e.g., a coordinated universal time (UTC) obtained from another source, such as a global navigation satellite system (GNSS)) using one or more formulas. In another example, the information identifying the CSI-RS 405 may additionally or alternatively include an indication of a slot index within the system frame number or direct frame number for the CSI-RS 405, such as the slot index for the slot when the CSI-RS 405 was transmitted by the triggering UE 402 or received by the reporting UE 404. For example, the indication of the slot index may include the actual slot index or one or more parameters based on which the slot index can be determined.

In another example, the information identifying the CSI-RS 405 may additionally or alternatively include an indication of a time, such as an absolute time, for the CSI-RS 405. For example, the indication of the time may include the actual time or one or more parameters based on which the time can be determined. For example, the absolute time may correspond to the time when the CSI-RS 405 was transmitted by the triggering UE 402 or received by the reporting UE 404 (e.g., as measured in milliseconds, microseconds, or another unit of time). In another example, the information identifying the CSI-RS 405 may additionally or alternatively include an indication of a HARQ process identifier for a slot or a shared channel for the CSI-RS 405. For example, the indication of the HARQ process identifier may include the actual HARQ process identifier or one or more parameters based on which the HARQ process identifier can be determined. For example, the HARQ process identifier may be for the slot or the PSSCH where the CSI-RS 405 was transmitted by the triggering UE 402 or received by the reporting UE 404. In another example, the information may include a combination of at least two of a system frame number for the CSI-RS 405, a direct frame number for the CSI-RS 405, a slot index within the system frame number or the direct frame number for the CSI-RS 405, a time for the CSI-RS 405, or a HARQ process identifier for a slot or a shared channel for the CSI-RS 405, etc.

As illustrated at 415, the triggering UE 402 may use the information included in the CSI report 413 to identify the CSI-RS 405 as the basis for the CSI report 413.

Figure 6:
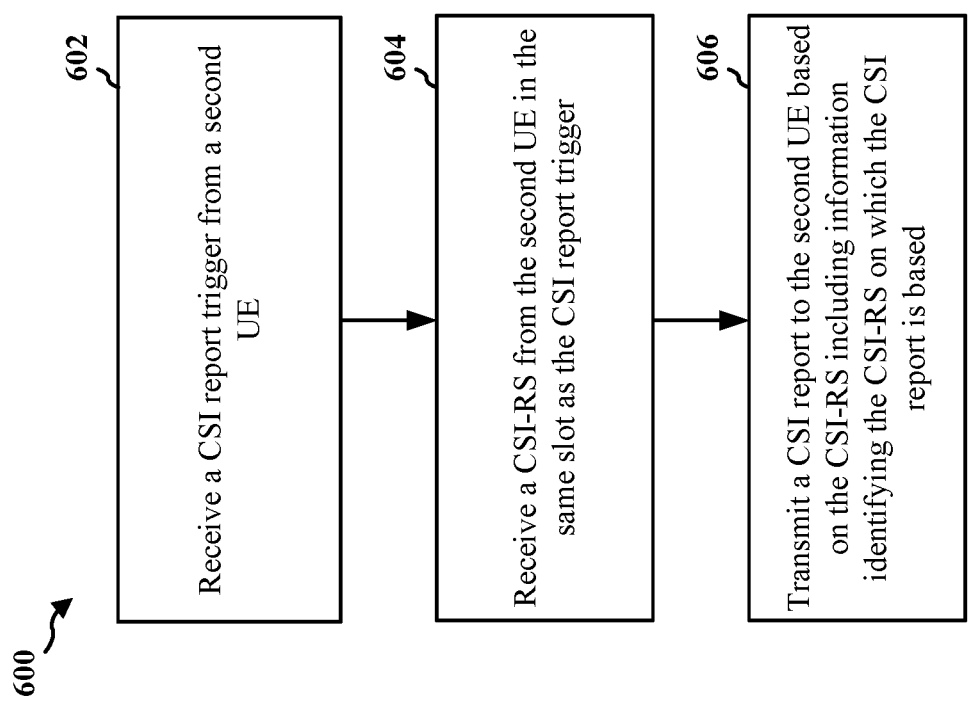
FIG. 6 is a flowchart of an example of a method of wireless communication including a CSI report in accordance with aspects of the present disclosure.

FIG. 6 is a flowchart 600 of an example of a method of wireless communication by a first device. The method may be performed by a device communicating based on sidelink, such as a UE or a component of a UE (e.g., the UE 104, 404; the device 310, 350; the apparatus 702/702'; the processing system 814, which may include memory and which may be an entire UE or a component of a UE). The method may enable a device triggering a CSI report to determine the CSI-RS to which the CSI report pertains.

At 602, the first UE receives a CSI report trigger from a second UE. The reception may be performed, e.g., by the trigger component 708 of the apparatus 702 in FIG. 7. FIG. 4 illustrates an example of the UE 404 receiving a CSI report trigger 403 from the UE 402. The first UE may receive the CSI report trigger in SCI from the second UE. The CSI report trigger may indicate that the CSI-RS is to be transmitted in the same slot as the SCI including the CSI report trigger.

At 604, the first UE receives a CSI-RS from the second UE in a same slot as the CSI report trigger. The reception may be performed, e.g., by the CSI-RS component 710 of the apparatus 702 in FIG. 7. FIG. 4 illustrates an example of the UE 404 receiving a CSI-RS 405 from the UE 402. FIG. 5 also illustrates an example of a CSI-RS transmitted in the same slot as a CSI report trigger.

At 606, the first UE transmits a CSI report to the second UE based on the CSI-RS, the CSI report including information identifying the CSI-RS on which the CSI report is based. The transmission may be performed, e.g., by the CSI report component 712 of the apparatus 702 in FIG. 7. The first UE may receive additional CSI report triggers and/or CSI-RS before transmitting the CSI report. The first UE may transmit the CSI report in a MAC-CE, such as a MAC-CE on a sidelink shared channel (e.g., PSSCH) having associated SCI. The SCI may indicate a source (e.g., a L1 source ID) and a destination (e.g., a L1 destination ID) for the CSI report. The CSI report may include CQI and/or RI, for example. FIG. 4 illustrates an example of the UE 404 transmitting a CSI report 413 to the UE 402.

For example, the information identifying the CSI-RS may include a system frame number for the CSI-RS. For example, the system frame number may correspond to the system frame number when the CSI-RS was transmitted by the second UE or received by the first UE. The information identifying the CSI-RS may include a direct frame number for the CSI-RS. For example, the direct frame number may correspond to the direct frame number when the CSI-RS was transmitted by the second UE or received by the first UE. The information identifying the CSI-RS may further include a slot index within the system frame number or the direct frame number for the CSI-RS, such as the slot index for the slot when the CSI-RS was transmitted by the second UE or received by the first UE. The information identifying the CSI-RS may include a time, such as an absolute time, for the CSI-RS. For example, the absolute time may correspond to the time when the CSI-RS was transmitted by the second UE or received by the first UE. The information identifying the CSI-RS may include a HARQ process identifier for a slot or a shared channel for the CSI-RS. For example, the HARQ process identifier may be for the slot or the PSSCH where the CSI-RS was transmitted by the second UE or received by the first UE. The information may include a combination of at least two of a system frame number for the CSI-RS, a direct frame number for the CSI-RS, a slot index within the system frame number or the direct frame number for the CSI-RS, a time for the CSI-RS, or a HARQ process identifier for a slot or a shared channel for the CSI-RS, etc., as described above.

Figure 7:
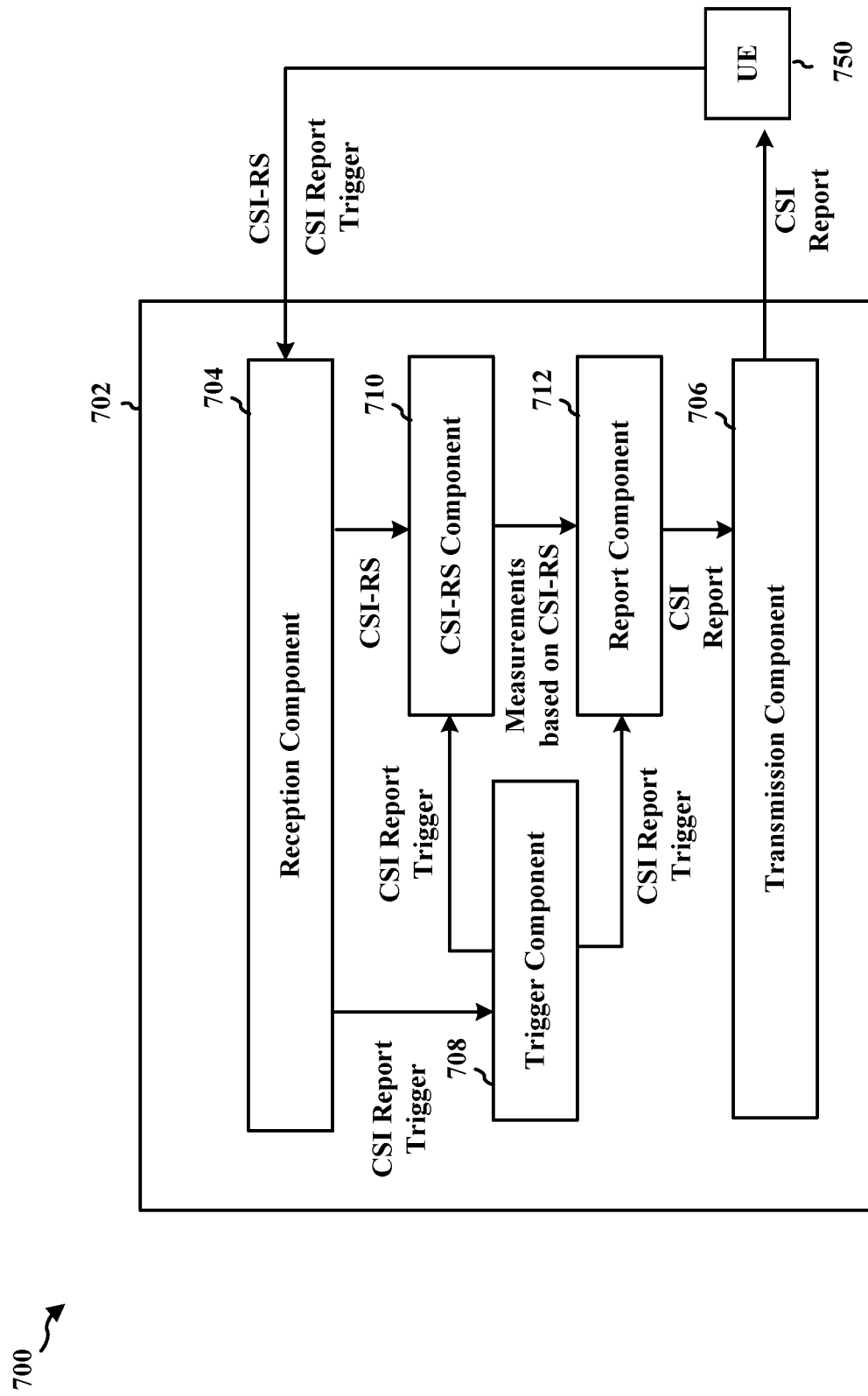
FIG. 7 is a conceptual data flow diagram illustrating an example, of a data flow between different means/components in an example apparatus.

FIG. 7 is a conceptual data flow diagram 700 illustrating an example of a data flow between different means/components in an example apparatus 702. The apparatus may be a device communicating based on sidelink, such as a first UE (or a component of a UE) configured to communicate directly with a second UE based on sidelink. The apparatus includes a reception component 704 configured to receive sidelink communication directly from the second UE 750 and a transmission component 706 configured to transmit communication directly to the second UE 750. The apparatus includes a trigger component 708 configured to receive a CSI report trigger from a second UE, e.g., as described in connection with 602 in FIG. 6. The apparatus includes a CSI-RS component 710 configured to receive a CSI-RS from the second UE in a same slot as the CSI report trigger, e.g., as described in connection with 604 in FIG. 6. The apparatus includes a CSI report component 712 configured to transmit a CSI report to the second UE based on the CSI-RS, the CSI report including information identifying the CSI-RS on which the CSI report is based, e.g., as described in connection with 606 in FIG. 6.

The apparatus 702 may include additional components that perform each of the blocks of the algorithm in the aforementioned flowchart of FIG. 6 and aspects performed by the UE 404 in FIG. 4. As such, each block in the aforementioned flowchart of FIG. 6 and aspects performed by the UE 404 in FIG. 4 may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
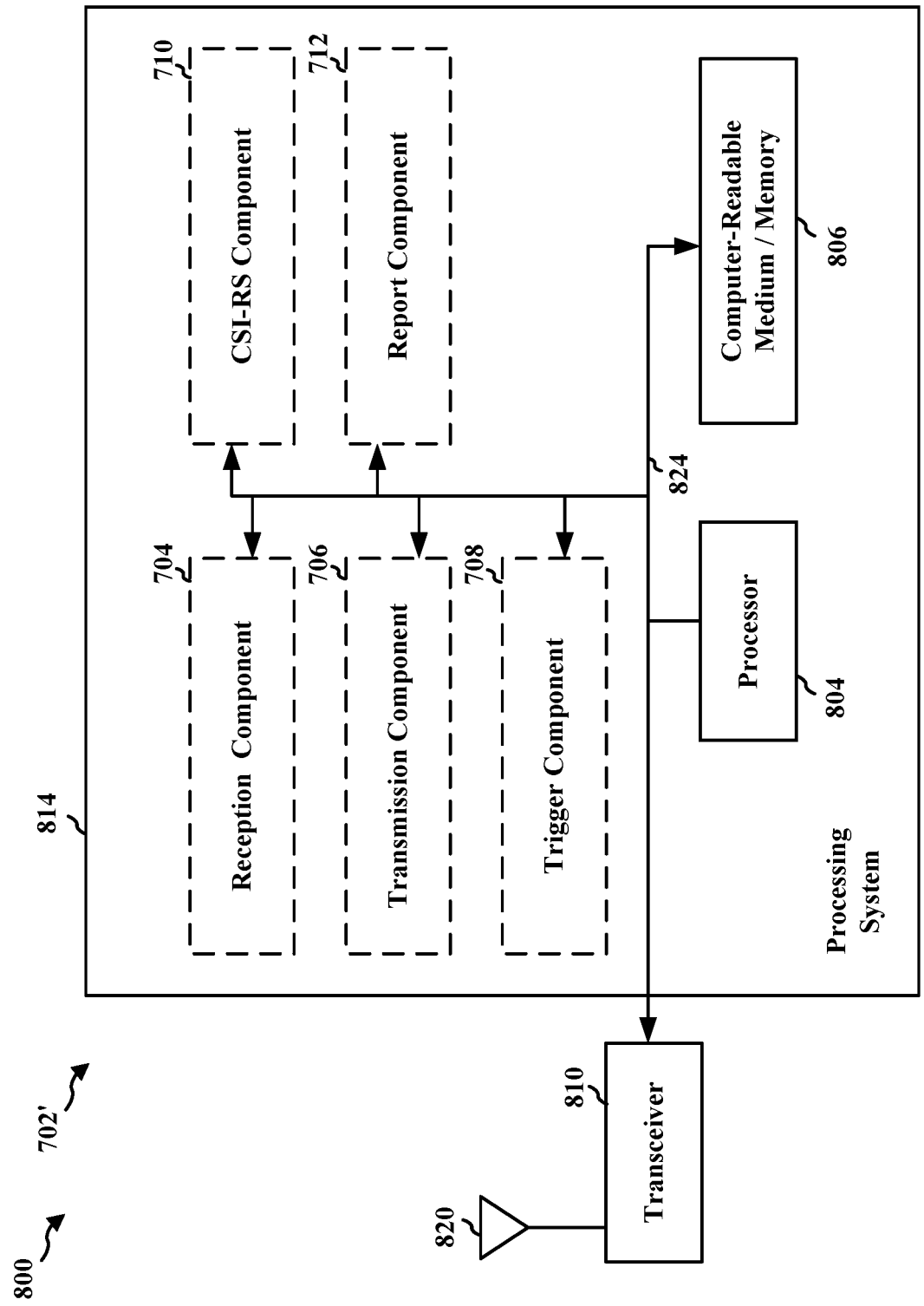
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the device 310 or device 350 and may include the memory 376, 360 and/or at least one of the TX processor 316, 368, the RX processor 370, 356, and the controller/processor 375, 359. Alternatively, the processing system 814 may be the entire UE (e.g., see device 310 or 350 of FIG. 3).

In one configuration, the apparatus 702/702' for wireless communication includes means for receiving a CSI report trigger from a second UE, means for receiving a CSI-RS from the second UE in a same slot as the CSI report trigger, and means for transmitting a CSI report to the second UE based on the CSI-RS, the CSI report including information identifying the CSI-RS on which the CSI report is based. The aforementioned means may be one or more of the aforementioned components of the apparatus 702 and/or the processing system 814 of the apparatus 702' configured to perform the functions recited by the aforementioned means. As described supra, the processing system 814 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 9:
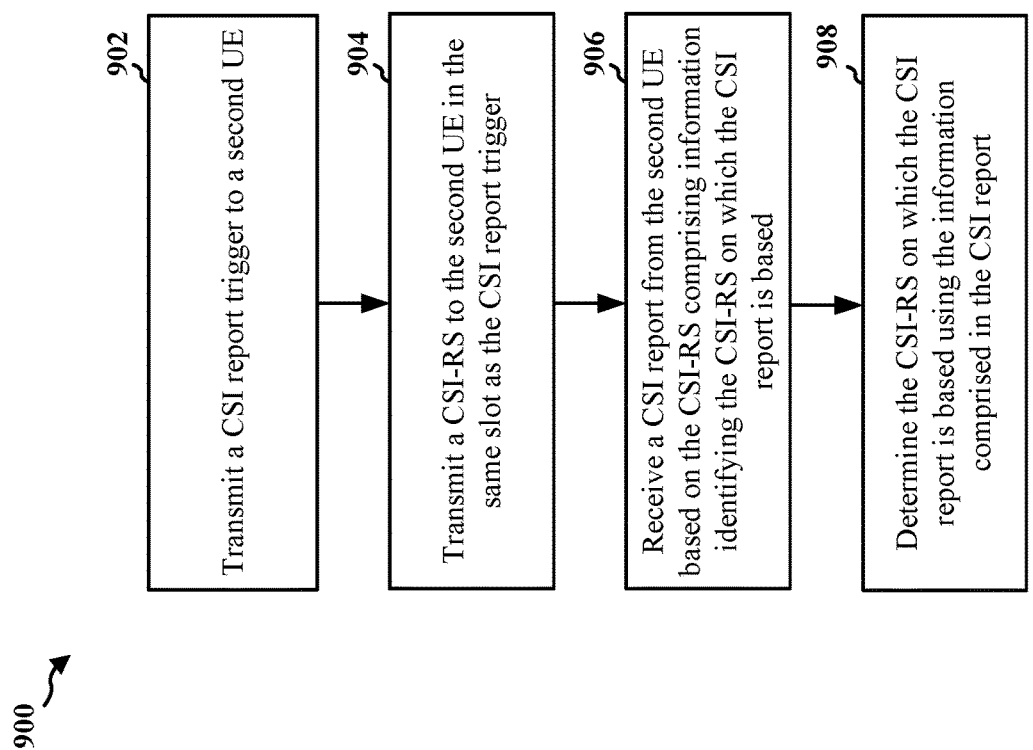
FIG. 9 is a flowchart of an example of a method of wireless communication including receiving a CSI report in accordance with aspects of the present disclosure.

FIG. 9 is a flowchart 900 of an example of a method of wireless communication The method may be performed by a device communicating based on sidelink, such as a UE or a component of a UE (e.g., the UE 104, 402; device 310, 350; the apparatus 1002/1002'; the processing system 1114, which may include memory and which may be an entire UE or a component of a UE). The UE triggering the CSI report may send additional CSI report triggers and/or CSI-RS prior to receiving the CSI report. The method may enable a device triggering a CSI report to determine the CSI-RS to which the CSI report pertains.

At 902, the first UE transmits a CSI report trigger to a second UE. The transmission may be performed, e.g., by the trigger component 1008 of the apparatus 1002 in FIG. 10. FIG. 4 illustrates an example of the UE 402 transmitting a CSI report trigger 403 to the UE 404. The first UE may transmit the CSI report trigger in SCI to the second UE. The CSI report trigger may indicate that the CSI-RS is to be transmitted in the same slot as the SCI including the CSI report trigger.

At 904, the first UE transmits a CSI-RS to the second UE in a same slot as the CSI report trigger. The transmission may be performed, e.g., by the CSI-RS component 1010 of the apparatus 1002 in FIG. 10. FIG. 4 illustrates an example of the UE 402 transmitting a CSI-RS 405 to the UE 404. FIG. 5 also illustrates an example of a CSI-RS transmitted in the same slot as a CSI report trigger.

At 906, the first UE receives a CSI report from the second UE based on the CSI-RS, the CSI report including information identifying the CSI-RS on which the CSI report is based. The reception may be performed, e.g., by the CSI report component 1012 of the apparatus 1002 in FIG. 10. The first UE may transmit additional CSI report triggers and/or CSI-RS before receiving the CSI report, at 906, as described in connection with FIG. 4. The first UE may receive the CSI report in a MAC-CE from the second UE, such as a MAC-CE on a sidelink shared channel having associated SCI. The SCI may indicate a source (e.g., a L1 source ID) and a destination (e.g., a L1 destination ID) for the CSI report. The CSI report may include CQI and/or RI, for example. FIG. 4 illustrates an example of the UE 402 receiving a CSI report 413 from the UE 402.

For example, the information identifying the CSI-RS may include a system frame number for the CSI-RS. For example, the system frame number may correspond to the system frame number when the CSI-RS was transmitted by the first UE or received by the second UE. The information identifying the CSI-RS may include a direct frame number for the CSI-RS. For example, the direct frame number may correspond to the direct frame number when the CSI-RS was transmitted by the first UE or received by the second UE.

The information identifying the CSI-RS may further include a slot index within the system frame number or the direct frame number for the CSI-RS, such as the slot index for the slot when the CSI-RS was transmitted by the first UE or received by the second UE. The information identifying the CSI-RS may include a time, such as an absolute time, for the CSI-RS. For example, the absolute time may correspond to the time when the CSI-RS was transmitted by the first UE or received by the second UE. The information identifying the CSI-RS may include a HARQ process identifier for a slot or a shared channel for the CSI-RS. For example, the HARQ process identifier may be for the slot or the PSSCH where the CSI-RS was transmitted by the first UE or received by the second UE. The information may include a combination of at least two of a system frame number for the CSI-RS, a direct frame number, a slot index within the system frame number or the direct frame number for the CSI-RS, a time for the CSI-RS, or a HARQ process identifier for a slot or a shared channel for the CSI-RS, etc., as described above.

At 908, the first UE, determines the CSI-RS on which the CSI report is based using the information included in the CSI report. The determination may be performed by the determination component 1014 of the apparatus 1002 in FIG. 10. The first UE can accordingly process the CSI report to modify one or more parameters for communicating with the second UE over the sidelink, for example.

Figure 10:
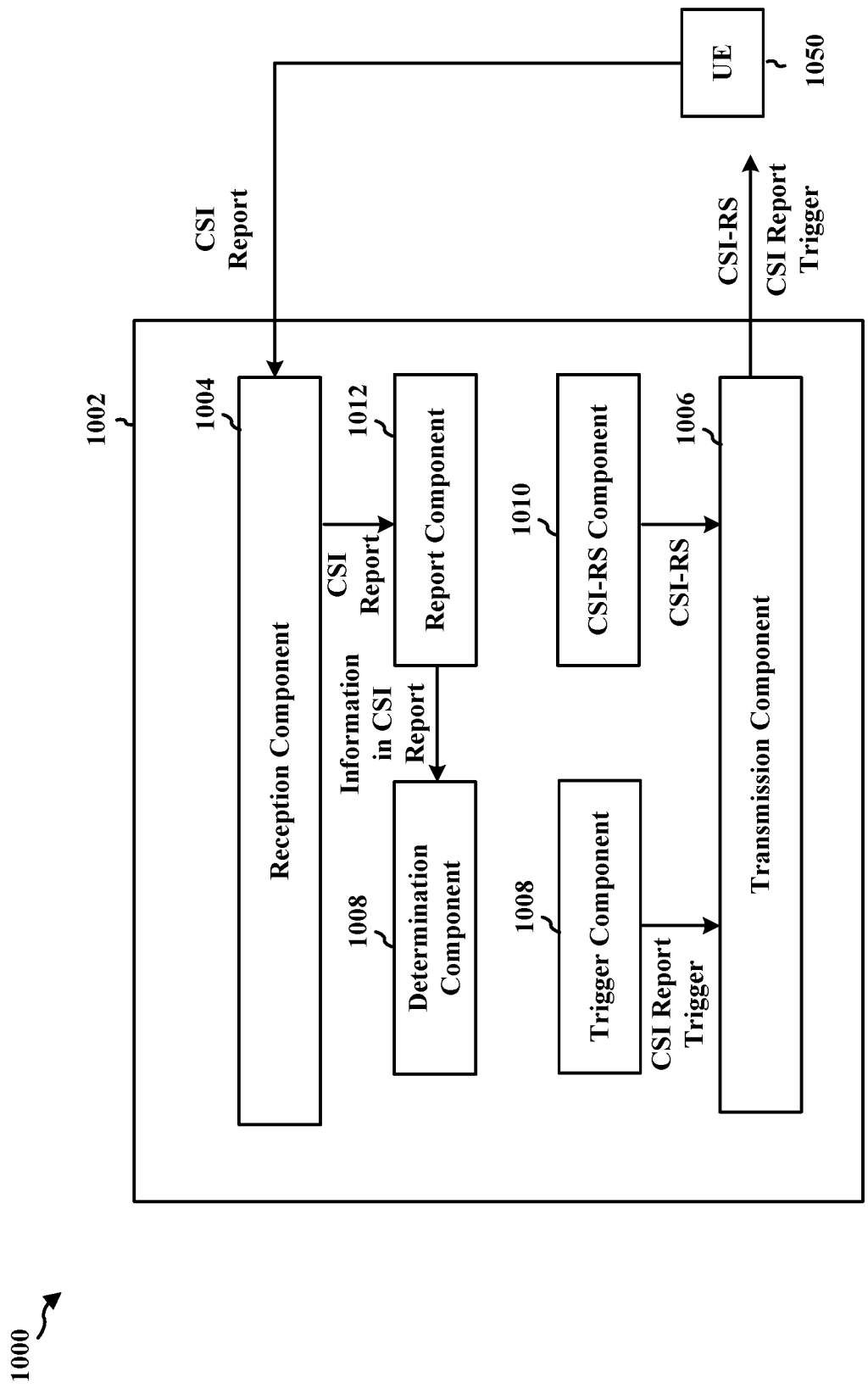
FIG. 10 is a conceptual data flow diagram illustrating an example of a data flow between different means/components in an example apparatus.

FIG. 10 is a conceptual data flow diagram 1000 illustrating an example of a data flow between different means/components in an example apparatus 1002. The apparatus may be a device communicating based on sidelink, such as a first UE (or a component of a UE) configured to communicate directly with a second UE based on sidelink. The apparatus includes a reception component 1004 configured to receive sidelink communication directly from the second UE 1050 and a transmission component 1006 configured to transmit communication directly to the second UE 1050. The apparatus includes a trigger component 1008 configured to transmit a CSI report trigger to the second UE 1050, e.g., as described in connection with 902 in FIG. 9. The apparatus includes a CSI-RS component 1010 configured to transmit a CSI-RS to the second UE in a same slot as the CSI report trigger, e.g., as described in connection with 904 in FIG. 9. The apparatus includes a CSI report component 1012 configured to receive a CSI report from the second UE based on the CSI-RS, the CSI report including information identifying the CSI-RS on which the CSI report is based, e.g., as described in connection with 906 in FIG. 9. The apparatus includes a determination component 1014 configured to determine the CSI-RS on which the CSI report is based using the information included in the CSI report, e.g., as described in connection with 908 in FIG. 9.

The apparatus 1002 may include additional components that perform each of the blocks of the algorithm in the aforementioned flowchart of FIG. 9 and aspects performed by the UE 402 in FIG. 4. As such, each block in the aforementioned flowchart of FIG. 9 and aspects performed by the UE 402 in FIG. 4 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
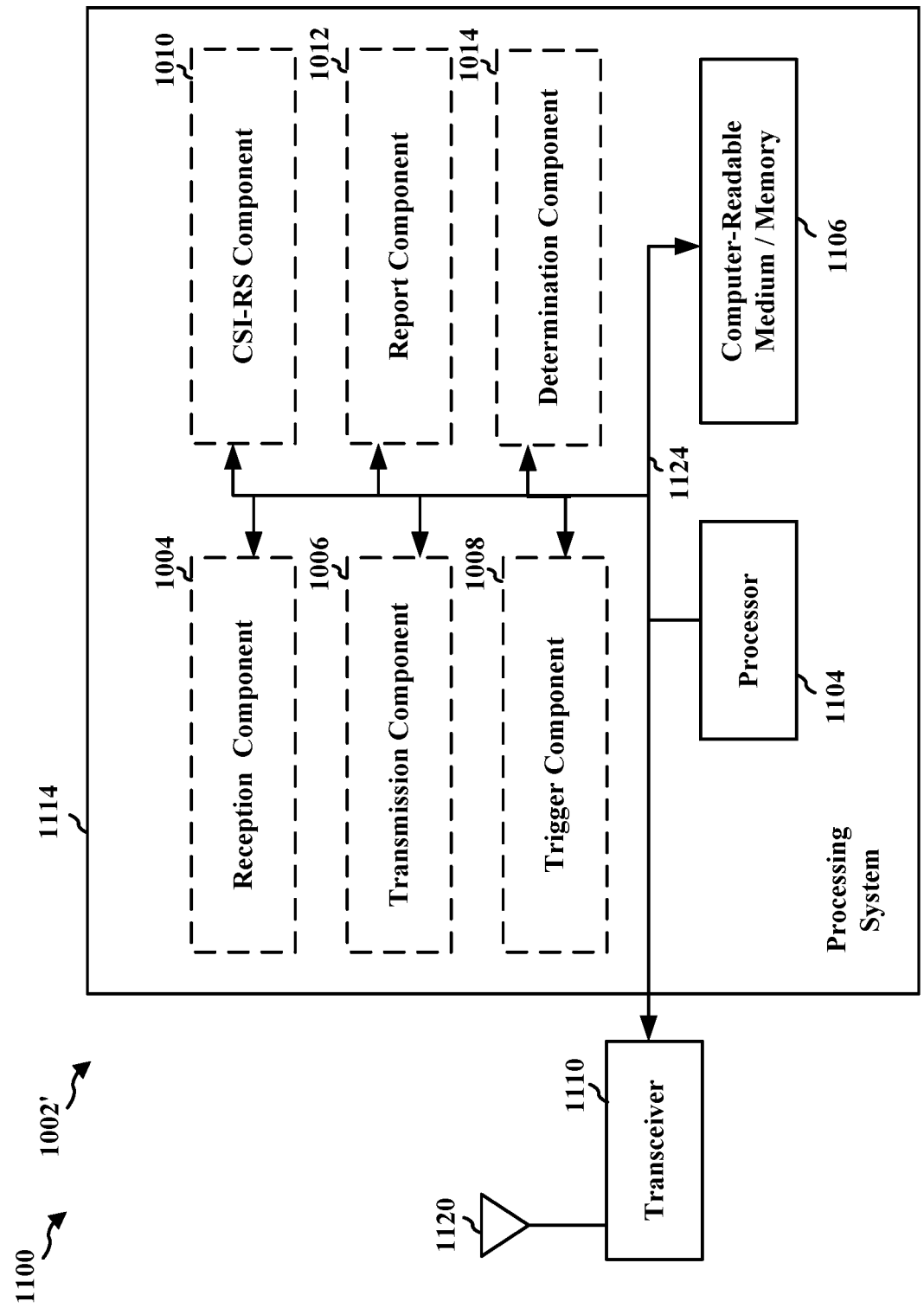
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the device 310 or the device 350 and may include the memory 376, 360 and/or at least one of the TX processor 316, 368, the RX processor 370, 356, and the controller/processor 375, 359. Alternatively, the processing system 1114 may be the entire UE (e.g., see device 310 or 350 of FIG. 3).

In one configuration, the apparatus 1002/1002' for wireless communication includes means for transmitting a CSI report trigger to a second UE, means for transmitting a CSI-RS to the second UE in a same slot as the CSI report trigger, means for receiving a CSI report from the second UE based on the CSI-RS including information identifying the CSI-RS on which the CSI report is based, and means for determining the CSI-RS on which the CSI report is based using the information included in the CSI report. The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 316, 368, the RX processor 370, 356, and the controller/processor 375, 359. As such, in one configuration, the aforementioned means may be the TX processor 316, 368, the RX processor 370, 356, and the controller/ processor 375, 359 configured to perform the functions recited by the aforementioned means.

The following aspects are illustrative only and aspects thereof may be combined with aspects of other embodiments or teaching described herein, without limitation.

Aspect 1 is a method of wireless communication at a first UE, comprising: receiving a CSI report trigger from a second UE, receiving a CSI-RS from the second UE in a same slot as the CSI report trigger, and transmitting a CSI report to the second UE based on the CSI-RS, the CSI report comprising information identifying the CSI-RS on which the CSI report is based.

In Aspect 2, the method of Aspect 1 further includes that the information identifying the CSI-RS includes a system frame number or a direct frame number for the CSI-RS.

In Aspect 3, the method of Aspect 1 or 2 further includes that the information identifying the CSI-RS further includes a slot index within the system frame number or the direct frame number for the CSI-RS.

In Aspect 4, the method of any of Aspect 1-3 further includes that information identifying the CSI-RS includes a time for the CSI-RS.

In Aspect 5, the method of any of Aspect 1-4 further includes that wherein the information identifying the CSI-RS includes a HARQ process identifier for a slot or a shared channel for the CSI-RS.

In Aspect 6, the method of any of Aspect 1-5 further include that the information identifying the CSI-RS includes at least two of a system frame number or a direct frame number for the CSI-RS, a slot index within the system frame number or the direct frame number for the CSI-RS; a time for the CSI-RS; or a HARQ process identifier for a slot or a shared channel for the CSI-RS.

In Aspect 7, the method of any of Aspect 1-6 further includes that the first UE transmits the CSI report in a MAC-CE.

In Aspect 8, the method of any of Aspect 1-7 further includes that the MAC-CE comprising the CSI report on a sidelink shared channel having associated sidelink control information indicating a source and a destination.

In Aspect 9, the method of any of Aspect 1-8 further includes that the first UE receives the CSI report trigger in sidelink control information from the second UE.

Aspect 10 is a device including one or more processors and one or more memories in electronic communication with the one or more processors storing instructions executable by the one or more processors to cause the device to implement a method as in any of Aspects 1-9.

Aspect 11 is a system or apparatus including means for implementing a method or realizing an apparatus as in any of Aspects 1-9.

Aspect 12 is a non-transitory computer readable medium storing instructions executable by one or more processors to cause the one or more processors to implement a method as in any of Aspects 1-9.

Aspect 13 is a method of wireless communication at a first UE, comprising: transmitting a CSI report trigger to a second UE, transmitting a CSI-RS to the second UE in a same slot as the CSI report trigger, receiving a CSI report from the second UE based on the CSI-RS comprising information identifying the CSI-RS on which the CSI report is based, and determining the CSI-RS on which the CSI report is based using the information comprised in the CSI report.

In Aspect 14, the method of Aspect 13 further includes that the information identifying the CSI-RS includes a system frame number or a direct frame number for the CSI-RS.

In Aspect 15, the method of Aspect 13 or 14 further includes that the information identifying the CSI-RS further includes a slot index within the system frame number or the direct frame number for the CSI-RS.

In Aspect 16, the method of any of Aspect 13-15 further includes that information identifying the CSI-RS includes a time for the CSI-RS.

In Aspect 17, the method of any of Aspect 13-16 further includes that wherein the information identifying the CSI-RS includes a HARQ process identifier for a slot or a shared channel for the CSI-RS.

In Aspect 18, the method of any of Aspect 13-17 further include that the information identifying the CSI-RS includes at least two of a system frame number for the CSI-RS, a direct frame number, a slot index within the system frame number or the direct frame number for the CSI-RS; a time for the CSI-RS; or a HARQ process identifier for a slot or a shared channel for the CSI-RS.

In Aspect 19, the method of any of Aspect 13-18 further includes that the first UE receives the CSI report in a MAC-CE.

In Aspect 20, the method of any of Aspect 13-19 further includes that the MAC-CE comprising the CSI report is received on a sidelink shared channel having associated sidelink control information indicating a source and a destination.

In Aspect 21, the method of any of Aspect 13-20 further includes that the first UE transmits the CSI report trigger in sidelink control information to the second UE.

Aspect 22 is a device including one or more processors and one or more memories in electronic communication with the one or more processors storing instructions executable by the one or more processors to cause the device to implement a method as in any of Aspects 13-21.

Aspect 23 is a system or apparatus including means for implementing a method or realizing an apparatus as in any of Aspects 13-21.

Aspect 24 is a non-transitory computer readable medium storing instructions executable by one or more processors to cause the one or more processors to implement a method as in any of Aspects 13-21.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
   receiving a channel state information (CSI) report trigger from a second UE;
   receiving a channel state information reference signal (CSI-RS) from the second UE in a same slot as the CSI report trigger; and
   transmitting a CSI report to the second UE based on the CSI-RS, the CSI report comprising information identifying the CSI-RS on which the CSI report is based, wherein the information identifying the CSI-RS includes at least one of:
      a system frame number or a direct frame number of a frame within which the CSI-RS is received;
      a slot index within the system frame number or the direct frame number of the frame within which the CSI-RS is received;
      an indication of an absolute time at which the CSI-RS is received;
      a Hybrid Automatic Repeat Request (HARQ) process identifier for a slot or a shared channel within which the CSI-RS is received; or
      a combination thereof.

2. The method of claim 1, wherein the information identifying the CSI-RS includes the system frame number or the direct frame number of the frame within which the CSI-RS is received.

3. The method of claim 2, wherein the information identifying the CSI-RS further includes the slot index within the system frame number or the direct frame number of the frame within which the CSI-RS is received.

4. The method of claim 1, wherein the information identifying the CSI-RS includes the indication of the absolute time at which the CSI-RS is received.

5. The method of claim 1, wherein the information identifying the CSI-RS includes the HARQ process identifier for the slot or the shared channel within which the CSI-RS is received.

6. The method of claim 1, wherein the information identifying the CSI-RS includes at least two of:
   the system frame number of the frame within which the CSI-RS is received;
   the direct frame number of the frame within which the CSI-RS is received;
   the slot index within the system frame number or the direct frame number of the frame within which the CSI-RS is received;
   the indication of the absolute time at which the CSI-RS is received; or
   the HARQ process identifier for the slot or the shared channel within which the CSI-RS is received.

7. The method of claim 1, wherein the first UE transmits the CSI report in a medium access control-control element (MAC-CE).

8. The method of claim 7, wherein the first UE transmits the MAC-CE comprising the CSI report on a sidelink shared channel having associated sidelink control information indicating a source and a destination.

9. The method of claim 1, wherein the first UE receives the CSI report trigger in sidelink control information from the second UE.

10. A method of wireless communication at a first user equipment (UE), comprising:
    transmitting a channel state information (CSI) report trigger to a second UE;
    transmitting a channel state information reference signal (CSI-RS) to the second UE in a same slot as the CSI report trigger;
    receiving a CSI report from the second UE based on the CSI-RS, the CSI report comprising information identifying the CSI-RS on which the CSI report is based, wherein the information identifying the CSI-RS includes at least one of:
       a system frame number or a direct frame number of a frame within which the CSI-RS is received;
       a slot index within the system frame number or the direct frame number of the frame within which the CSI-RS is received;
       an indication of an absolute time at which the CSI-RS is received;
       a Hybrid Automatic Repeat Request (HARQ) process identifier for a slot or a shared channel within which the CSI-RS is received; or
       a combination thereof; and
    determining the CSI-RS on which the CSI report is based using the information comprised in the CSI report.

11. The method of claim 10, wherein the information identifying the CSI-RS includes the system frame number or the direct frame number of the frame within which the CSI-RS is received.

12. The method of claim 11, wherein the information identifying the CSI-RS further includes the slot index within the system frame number or the direct frame number of the frame within which the CSI-RS is received.

13. The method of claim 10, wherein the information identifying the CSI-RS includes the indication of the absolute time at which the CSI-RS is received.

14. The method of claim 10, wherein the information identifying the CSI-RS includes the HARQ process identifier for the slot or the shared channel within which the CSI-RS is received.

15. The method of claim 10, wherein the information identifying the CSI-RS includes at least two of:
    the system frame number of the frame within which the CSI-RS is received;
    the direct frame number of the frame within which the CSI-RS is received;

the slot index within the system frame number or the direct frame number of the frame within which the CSI-RS;

the indication of the absolute time at which the CSI-RS is received; or the HARQ process identifier for the slot or the shared channel within which the CSI-RS is received.

16. The method of claim 10, wherein the first UE receives the CSI report in a medium access control-control element (MAC-CE) from the second UE.

17. The method of claim 16, wherein the first UE receives the MAC-CE comprising the CSI report on a sidelink shared channel having associated sidelink control information indicating a source and a destination.

18. The method of claim 10, wherein the first UE transmits the CSI report trigger in sidelink control information to the second UE.

19. An apparatus for wireless communication at a first user equipment (UE), comprising:
a memory; and
at least one processor coupled to the memory and configured to:
receive a channel state information (CSI) report trigger from a second UE;
receive a channel state information reference signal (CSI-RS) from the second UE in a same slot as the CSI report trigger; and
transmit a CSI report to the second UE based on the CSI-RS, the CSI report comprising information identifying the CSI-RS on which the CSI report is based, wherein the information identifying the CSI-RS includes at least one of:
a system frame number or a direct frame number of a frame within which the CSI-RS is received;
a slot index within the system frame number or the direct frame number of the frame within which the CSI-RS is received;
an indication of an absolute time at which the CSI-RS is received;
a Hybrid Automatic Repeat Request (HARQ) process identifier for a slot or a shared channel within which the CSI-RS is received; or
a combination thereof.

20. The apparatus of claim 19, wherein the information identifying the CSI-RS includes the system frame number or the direct frame number within which the CSI-RS is received.

21. The apparatus of claim 20, wherein the information identifying the CSI-RS further includes the slot index within the system frame number or the direct frame number of the frame within which the CSI-RS is received.

22. The apparatus of claim 19, wherein the information identifying the CSI-RS includes the indication of the absolute time at which the CSI-RS is received.

23. The apparatus of claim 19, wherein the information identifying the CSI-RS includes the HARQ process identifier for the slot or the shared channel within which the CSI-RS is received.

24. The apparatus of claim 19, wherein the information identifying the CSI-RS includes at least two of:
the system frame number of the frame within which the CSI-RS is received;
the direct frame number of the frame within which the CSI-RS is received;
the slot index within the system frame number or the direct frame number of the frame within which the CSI-RS is received;
the indication of the absolute time at which the CSI-RS is received; or
the HARQ process identifier for the slot or the shared channel within which the CSI-RS is received.

25. An apparatus for wireless communication at a first user equipment (UE), comprising:
a memory; and
at least one processor coupled to the memory and configured to:
transmit a channel state information (CSI) report trigger to a second UE;
transmit a channel state information reference signal (CSI-RS) to the second UE in a same slot as the CSI report trigger;
receive a CSI report from the second UE based on the CSI-RS, the CSI report comprising information identifying the CSI-RS on which the CSI report is based, wherein the information identifying the CSI-RS includes at least one of:
a system frame number or a direct frame number of a frame within which the CSI-RS is received;
a slot index within the system frame number or the direct frame number of the frame within which the CSI-RS is received;
an indication of an absolute time at which the CSI-RS is received;
a Hybrid Automatic Repeat Request (HARQ) process identifier for a slot or a shared channel within which the CSI-RS is received; or
a combination thereof; and
determine the CSI-RS on which the CSI report is based using the information comprised in the CSI report.

26. The apparatus of claim 25, wherein the information identifying the CSI-RS includes the system frame number or the direct frame number of the frame within which the CSI-RS is received.

27. The apparatus of claim 26, wherein the information identifying the CSI-RS further includes the slot index within the system frame number or the direct frame number of the frame within which the CSI-RS is received.

28. The apparatus of claim 25, wherein the information identifying the CSI-RS includes the indication of the absolute time at which the CSI-RS is received.

29. The apparatus of claim 25, wherein the information identifying the CSI-RS includes the HARQ process identifier for the slot or the shared channel within which the CSI-RS is received.

30. The apparatus of claim 25, wherein the information identifying the CSI-RS includes at least two of:
the system frame number of the frame within which the CSI-RS is received;
the direct frame number of the frame within which the CSI-RS is received;
the slot index within the system frame number or the direct frame number of the frame within which the CSI-RS is received;
the indication of the absolute time at which the CSI-RS is received; or
the HARQ process identifier for the slot or the shared channel within which the CSI-RS is received.

\* \* \* \* \*